Patented June 27, 1950

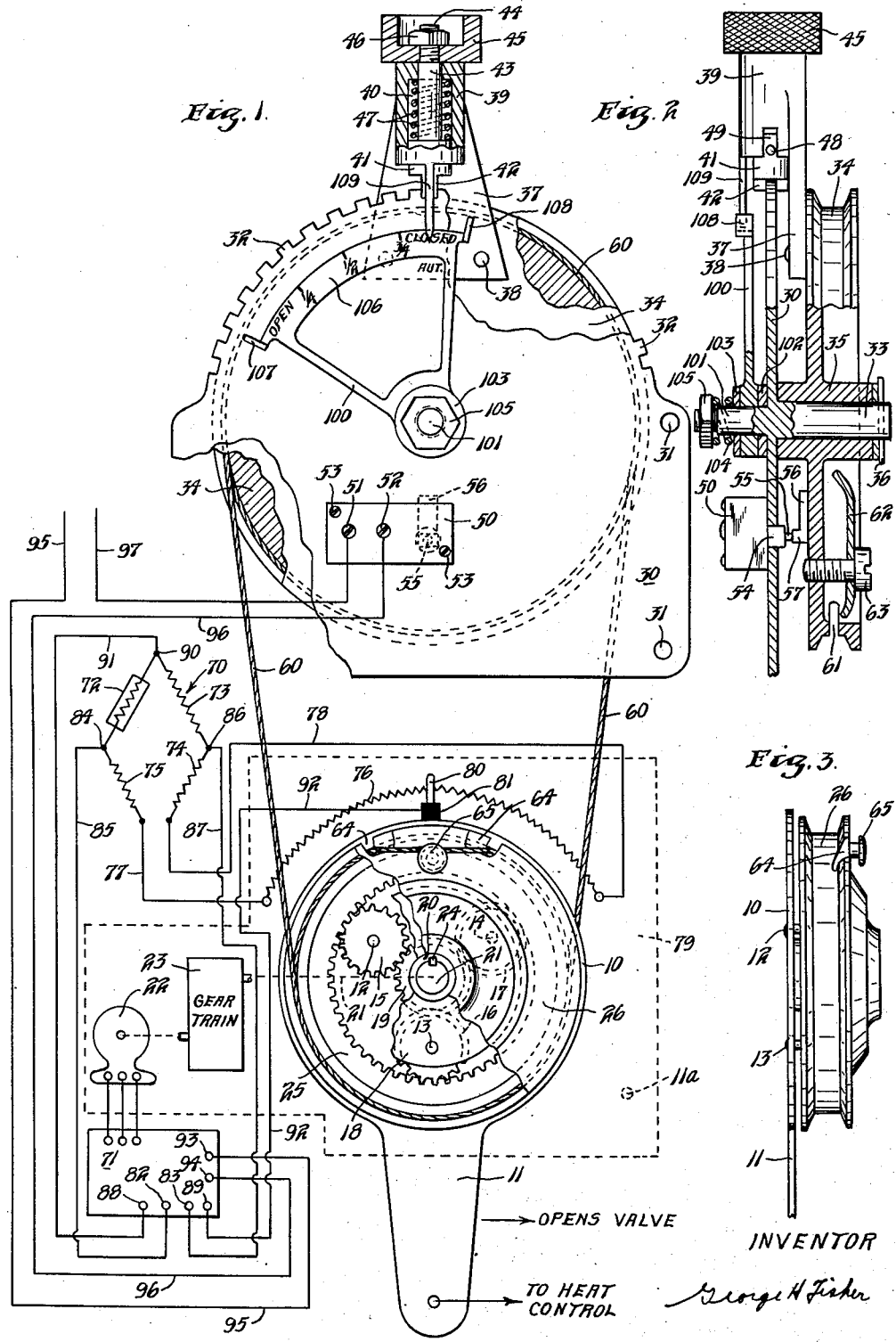

2,512,770

UNITED STATES PATENT OFFICE 2,512,770

MANUAL CONTROL MECHANISM

George H. Fisher, St. Louis Park, Minn., assignor to Minneapolis-Honeywell Regulator Company, Minneapolis, Minn., a corporation of Delaware Application November 24, 1944, Serial No. 564,976

10 Claims. (Cl. 116—124)

My invention relates to an improvement in regulating apparatus of the class in which a member is automatically positioned in response to a pre-existing condition, but which has optional means for manual control. In particular, the invention applies to a means for indicating the position of a remote member during the period when said member is subject to manual control. The present invention is an improvement for the mechanism disclosed in the co-pending application of John M. Wilson, Serial No. 461,970, filed October 14, 1942, now Patent Number 2,397,068, issued March 19, 1946.

In the co-pending application referred to above, an automatically controlled planetary gear mechanism is provided for controlling the position of a heat control valve for an aircraft cabin. Provision is made for manually positioning said valve control member in the event that an alternative condition is desired, or, in the event of failure of the power controlled motor means. The present invention is provided for indicating the position of said valve control member during the period of manual control, which position cannot otherwise be indicated because of the nature of the automatic portion of the control mechanism.

In the present invention, a movable member having an index shield is arranged to be mounted adjacent the manually controlled portion of the device and is so arranged as to be made movable by the manually controlled member if necessary, and when properly positioned, it will indicate the range of movement required by the manual member to position the valve control member anywhere between open and closed positions, thereby enabling the operator to select a desired position of the valve.

The principal object of my invention is to provide means cooperable with a planetary mechanism having optional manual control, for indicating the position of the controlled member during the period of manual control.

Other and further objects will become apparent in the following description and claims, and in the appended drawings in which:

Figure 1 is a showing of the complete system with certain parts broken away, and others in cross-section to more clearly show the structure thereof;

Figure 2 is a side-view of the upper portion of the apparatus shown in Figure 1 with certain parts in section and others broken away to more clearly illustrate the structure thereof; and, Figure 3 is a side-view of that part of the apparatus shown in the lower part of Figure 1.

Referring to Figures 1 and 3, the planetary mechanism comprises a substantially circular plate 10 having an arm 11 extending therefrom. The plate 10 and arm 11 constitute the device or member which is to be positioned, or the driven arm of the apparatus. This driven arm 11 may be utilized to control any desired apparatus and it is herein contemplated that the arm 11 will be connected to any suitable heat control mechanism, such as for use in heating the cabin of an aircraft. Three stud shafts, 12, 13, and 14 are secured to the plate 10 at equally spaced points on an imaginary circle having the same center as the periphery of the circular plate 10. Mounted upon the stud shafts 12, 13, and 14 for rotation are planet pinions 15, 16, and 17. The stud shafts 12, 13, and 14 extend entirely through the planet pinions 15, 16, and 17, and through a plate 18 which serves to secure the front end of the stud shafts 12, 13, and 14 as viewed in Figure 1. Also located between the plates 10 and 18 and meshing with each of the planet pinions 15, 16, and 17 is a sun pinion 19. The sun pinion 19 is secured to a tubular bearing member 20 which extends through the plate 18 and terminates at some distance inside of it. The interior of this tubular bearing member 20 is secured to a final driven shaft 21 which is connected to a reversible electric motor 22 of the split-phase type through a suitable reducing gear train 23. The tubular member 20 may be secured to the shaft 21 in any desired manner and is herein shown as keyed thereto at 24. Cooperating with the outer portions of each of the planet pinions 15, 16, and 17 is an internal gear 25. This internal gear 25 may be made integral with, or be fixedly secured to a cable drum 26.

The cable drum 26 may of itself constitute the manual operator. However, it is preferred to have the manual operator capable of being located at a point remote from the planetary mechanism. To accomplish this purpose, a remote manual operator is connected to the cable drum 26. Referring now to the upper part of Figure 1 and to Figure 2, the remote manual mechanism includes a mounting plate 30 having mounting holes 31 therein by means of which the plate 30 may be secured to any desired part of the aircraft cabin so that the manual operating means can be conveniently operated by the pilot. The lower half of the mounting plate 30 is substantially rectangular in form whereas the upper half thereof is in the form of a semicircle having teeth or notches 32 formed in the periphery thereof. Extending backwardly from the mounting plate 30 is a trunnion shaft 33 upon which a second cable drum is mounted. This cable drum comprises the drum portion proper 34, and the bearing member or hub 35 which rotates upon the trunnion 33. This hub 35 is retained on the trunnion 33 in any suitable manner such as by the cotter pin 36.

A plate 37 is secured to the cable drum 34 by means of screws 38. Formed integrally with the plate 37 is a cylindrical housing 39 provided with an internal bore 40. Closely fitting and slidably mounted within the bore 40 is a cylindrical member 41, and a notch portion 42 adapted to engage the notches formed by the teeth 32 on the semi-circular portion of plate 30. Formed integrally with the cylindrical member 41 and extending upwardly therefrom is a shank 43 terminating in a screw threaded portion 44 to which an operating knob 45 is secured by means of a nut 46. A spring 47 is mounted within the bore 40 having its upper end bearing against the underside of the housing 39 and its lower end bearing against the upper side of the cylindrical member 41, whereby the latching portion 42 is biased downwardly. As a result, the cable drum 34 is normally latched in a stationary position. The position in which the cable drum 34 is shown latched in Figure 1 is the "automatic" position as indicated on the plate 30 and as will be described hereinafter.

When it is desired to rotate the cable drum 34 in either direction, the operating knob 45 is pulled upwardly against the bias of spring 47 so as to remove the latching portion 42 from one of the notches between the teeth 32. Then, while the operating knob 45 is so held in an upward position, the whole assembly including the cable drum 34 may be rotated in either direction through substantially a quarter of a turn. If it is then desired to lock the cable drum 34 in some new position, the manual operating knob 45 is released whereupon the latching portion 42 enters a different notch between the teeth 32, and the drum 34, is thus locked in its new position. A pin 48 extends horizontally from the cylindrical member 41 through a notch 49 in the housing 39 to prevent turning of the latching portion 42 so that it cannot become crosswise in the teeth 32.

For reasons which will appear hereinafter, it is desirable to break an electrical circuit upon movement of the cable drum 34 out of its "automatic" position in which it is shown. To accomplish this, a snap switch 50 having terminals 51 and 52 is secured to the mounting plate 30 by means of screws 53. The snap switch 50 has a cylindrical extension 54 which extends through a suitable opening in the mounting plate 30. The snap switch 50 further includes an operating pin or push button 55 which extends through and projects beyond the cylindrical portion 54. A switch actuating member 56 having a push button operating portion 57 is secured to the cable drum 34 in such a position that it is engaged with the push button 55 and holds it in its innermost position when the cable drum 34 is in the "automatic" position as shown in Figure 1. However, upon slight movement of the cable drum in either direction away from the "automatic" position, the push button actuating extension 57 will move out from under the push button 55 whereupon the push button 55 automatically, through a biasing means contained within the switch 50, moves to its outer position. The switch 50 may be of any suitable type wherein a circuit is opened whenever the push button is in its outer position to which it is biased and in which such circuit is closed when the push button is held in its innermost position as it is with the parts in position shown in Figures 1 and 2. This switch 50 may take the form disclosed in Patent 2,318,734 issued to Albert E. Baak, on May 11, 1943.

The cable drums 34 and 26 are interconnected by means of a cable 60. For this purpose the cable drum 34 is provided with a slot 61 and a cable clamping plate 62 which can be held in clamping position by means of a screw 63. One end of the cable is clamped by means of a clamping plate 62. The cable is then wound about the cable drum 34 for substantially a complete turn after which it is wound completely around the cable drum 26 and then is again wound about the cable drum 34 the greater portion of a turn and the second end is then clamped by the clamping member 62. In order to prevent slippage of the cable on the cable drum 26, the cable drum is provided with a pair of slots 64 and a pin 65. When the cable is wound about the drum 26, it is brought out of one of the slots 64, wound around the pin 65 and then out through the other slot 64, and then wound around the pin 65 and then passes through the other slot 64 back onto the cable drum 26.

In the foregoing arrangement it will be seen that the cable drum 34 will be held stationary by means of the latching mechanism and through the cable 60. The cable drum 26 to which the internal gear 25 is secured will also be held stationary. However, the cable drum 34 may be rotated to a limited extent in each direction away from the "automatic" position by means of the housing 39 and such rotative movement will be transmitted to the cable drum 26, to provide manual means for rotatively moving the operating arm 11. The mechanism has been so constructed that the operating arm or driven member 11 is capable of arcuate movement through 120 degrees. Stop members, one of which is shown as 11a are provided at the opposite extremes of movement of the arm 11 to limit the arcuate movement of the driven member. The cable drum 34, which is intended to provide manual means of moving the arm 11 through connection with cable drum 26, is made sufficiently larger than cable drum 26 so that 75 degrees of rotation in either direction of cable drum 34 will be sufficient to move cable drum 26 and arm 11, 120 degrees because of the relative sizes of these two drums.

The power means constituting the split-phase motor 22 may be controlled in any desired manner. There is herein disclosed an automatic control system of the temperature responsive type which includes a resistance bridge circuit 70 and an electronic amplifier 71. The bridge circuit 70 includes in one arm a temperature responsive resistance 72 of usual construction, the resistance of which increases upon temperature rise. This temperature resistance 72 may respond, for example, to the temperature in an aircraft cabin. The three other arms of the bridge circuit include fixed resistances 73, 74, and 75. Those arms which include the fixed resistances 74 and 75, additionally include a variable amount of resistance of a balancing or follow-up potentiometer. This potentiometer includes a balancing resistance 76, the left-hand end of which is connected to the lower end of the fixed resistance 75, by a wire 77, whereas its right-hand end is connected to the lower end of fixed resistance 74 by a wire 78. The balancing resistance 76 may be suitably carried by a housing 79 so that it is stationary and does not move. Cooperating with this balancing resistance 76 is a slider arm 80 which moves in accordance with the movement of the plate 10 or driven arm 11. For convenience, the slider arm 80 has therefore been shown as attached to the plate 10 through a piece of insulating material 81. In actual practice, the motor 22, gear train 23, and the planetary mechanism may be conveniently mounted in the housing generally indicated by the dotted line 79.

The electronic amplifier 71 includes a pair of terminals 82 and 83 for supplying power to the bridge 70. Terminal 82 is connected to a bridge input terminal 84 by a wire 85. The bridge input terminal 84 comprises the junction of those arms which include the temperature sensitive resistance 72 and the fixed resistances 75. Similarly, amplifier terminal 83 is connected to a bridge input terminal 86 by a wire 87. The bridge input terminal 86 comprises the junction of those arms of the bridge which include the fixed resistances 73 and 74. The amplifier 71 further includes a pair of amplifier input terminals 88 and 89. Terminal 88 is connected to a bridge output terminal 90 by means of a wire 91. This terminal 90 constitutes the junction of those arms of the bridge circuit which include the temperature sensitive resistance 72 and the fixed resistance 73. The other terminal 89 of the amplifier is connected to slider arm 80 by means of a wire 92. In addition, the electronic amplifier 71 includes a pair of incoming power terminals 93 and 94. Power terminal 93 is directly connected to one wire 95 of any suitable source of alternating current. Terminal 94 is connected by means of wire 96 to the terminal 52 and switch 50. The terminal 51 thereof is connected to the other wire 97 of the alternating source of power.

The resistance bridge 70, the electronic amplifier 71, and the manner in which they are interconnected may take any of the forms shown in the art, but preferably utilize a system of the type disclosed in the co-pending application of Albert P. Upton, Serial No. 437,561, filed April 3, 1942, now Patent Number 2,423,534, issued July 8, 1947. In the type of system disclosed in the said Upton application, the split-phase motor 22 is provided with the usual two windings, one of which is constantly energized, and the other being energized only when the bridge circuit is unbalanced. However, upon unbalance of the bridge circuit in one direction, the second winding of the split-phase motor is energized with a current which has a phase leading that of the constantly energized winding, whereupon the motor rotates in one direction. On the other hand, when the bridge is unbalanced in the opposite direction, the second winding of the split-phase motor is supplied with a current which has a phase which lags that of the constantly energized winding with the result that the motor rotates in the opposite direction.

A sector 100 is mounted on a trunnion shaft 101 which extends forwardly from the plate 30. The sector is frictionally supported on the shaft 101 between the frictional washers 102 and 103 by a tension spring 104 which is held by a nut 105 that is threaded onto the end of the shaft 101. An arcuate portion 106 of the sector is provided with an index shield which indicates the relative position of the driven member or as in this case, the position of the valve which is in turn controlled by the driven member. On each end of the arcuate portion 106 are opposing projections 107 and 108 which are provided to cooperate with a finger 109 that extends downwardly from the forward edge of the latching housing 39. The purpose of the frictionally mounted segment and the projection 109 are to provide a means for indicating the position of the driven member 11 or the valve which it controls. It will be remembered that the movement of cable drum 34 by the latch housing 39 in either direction for 75 degrees provides movement of the driven arm 120 degrees, therefore this device serves to inform the pilot or operator, of the position of the driven member during the period of manual operation, regardless of the position it had assumed at the time of changeover from automatic to manual control, which position could not otherwise be detected, since the driven member is remotely located from the manual station.

*Automatic operation*

With the parts in the positions shown, the manual operator is in the "automatic" position with the result that the push button 55 of the switch 50 is in its innermost position and a circuit is closed between the terminals 51 and 52 of the switch 50. Therefore, power is being supplied to the electronic amplifier 71. Also, with the parts in the position shown, the temperature of the aircraft cabin is at an intermediate value and the heat control or valve operating arm 11 is in a position intermediate its possible extreme positions. Similarly, the slider arm 80 is on the center of the balancing resistance 76. Under such conditions, the bridge 70 is in balance and the second winding of the split-phase motor 22 is deenergized so that the motor is stationary.

Now let us assume that the temperature in the aircraft cabin rises. Under such condition, the resistance of the temperature sensitive resistance 72 increases and the bridge 70 is unbalanced. As a result, the electronic amplifier 71 supplies the second winding of the split phase motor 22 with a current out of phase with that of the constantly energized winding and in such direction that the sun pinion 19 is driven in a clockwise direction. Since the internal gear 25 is being held stationary by the remotely located manual mechanism, the planet pinions 15, 16, and 17 in rotating in a counterclockwise direction about their respective stud shafts 12, 13, and 14, will cause the plate 10 upon which the stud shafts are mounted to rotate in a clockwise direction. This operation will cause the arm 11 to move in a clockwise direction so as to move the valve or heat control apparatus toward closed position to reduce the amount of heat applied to the aircraft cabin. Such movement of the plate 10 causes the outer arm 80 to move toward the right-hand end of the balancing resistant 76. When sufficient movement has taken place, the bridge circuit will be unbalanced. When this occurs, the electronic amplifier 71 will deenergize the second winding of the split-phase motor 22 whereupon the rotation of the sun pinion 19 will cease. Likewise, the plate 10 will cease its movement.

On the other hand, if the temperature within the aircraft cabin should fall, the resistance of temperature resistance 72 decreases. This unbalances the bridge 70 in the opposite direction, causing the electronic amplifier 71 to energize the second winding of motor 22 with a current having an opposite phase than occurred upon temperature rise, so that the sun pinion 19 is rotated in a counterclockwise direction. Inasmuch as the internal gear 25 is still being held stationary, this counterclockwise rotation of the sun pinion 19 results in counterclockwise rotation of plate 10 and control arm 11, causing the heat control valve to move toward open position to supply additional heat to the cabin and at the same time to cause slider arm 80 to move toward the left-hand end of balanced resistant 76. When sufficient counterclockwise movement of the control arm 11 and the slider arm 80 has taken place, the bridge 70 will be rebalanced, whereupon the electronic amplifier 71 will deenergize the second winding of the motor 22 and further counterclockwise rotation of the sun pinion 19 will cease. Likewise, the plate 10 and the accompanying parts will also cease their movement.

In this manner, as long as the manual operator is in the "automatic" position, so that the internal gear 25 is held stationary, the arm 11 will be positioned in accordance with the movement of motor 22 which in this end are in accordance with the temperature fluctuation at the temperature sensitive resistance 72 which responds to the temperature of the interior of the aircraft.

*Manual operation*

It may be desired to take over manual positioning of the arm 11 at certain times. This manual positioning may be desired when the electrical system is in operative condition or it may be desired when for some reason or other the electrical system is inoperative.

Let us assume it is desired to increase the temperature of the aircraft cabin manually. The instant position of the valve or the valve control arm 11 is unknown to the pilot or operator since this portion of the device is remote from the cabin; however, for example, let us assume that it is in the vertical mid-position shown in the lower portion of Figure 1, which is indicative of a half-opened position of the valve. The position of the sector 100 at this time is not indicative of the position of the arm 11 but when manual control is assumed, the scale 106 should indicate the instant position of arm 11. Therefore, to coordinate the positions of arm 11 and sector 100, it may be necessary to move the knob 45 and control housing 39 in either or both directions to obtain this result. If the sector were in the position shown in the upper portion of Figure 1 and the housing 39 were moved in a counterclockwise direction to move the arm 11 to a fully open position, the pointer 109 would indicate on the scale 106 that the position was slightly less than half open, which of course is not the true position of the arm 11. Therefore to properly position both the arm 11 and sector 100, the knob 45 is lifted so as to disengage member 42 from the gear teeth 32 and the housing is moved in a clockwise direction as far as it will go. This operation will cause the arm 11 to move to a fully closed position and the pointer 109 will engage projection 108 and move the segment 100 in a clockwise direction so that when the housing 39 has reached the limit of its clockwise movement, pointer 109 will indicate on scale 106, that the valve is fully closed. Then by moving the housing 39 in a counterclockwise direction, the arm 11 will move towards open position and its actual position will be indicated on scale 106, and if the housing 39 is moved over its full range of movement to open position, pointer 109 will be in engagement with projection 107, which on scale 106 indicates a fully open position of the valve. Movement of the manual operator causes the switch actuating member 57 to move away from the push button 55, whereupon the button moves outwardly and breaks the circuit between terminals 51 and 52 of the switch 50. Breaking of this circuit interrupts the power supplied to the electronic amplifier 71 so that the motor 22 remains stationary irrespective of whether or not the electrical circuit is otherwise in operative condition. The movement of the manual operator is transmitted through cable 60 to the cable drum 26 and the associated internal gear 25 which likewise moves in the same direction. At this time, the sun pinion 19 is stationary because the motor circuit is broken, so that the motion of the internal gear results in the movement of plate 10 and the driven arm 11, which causes opening or closing of the heat control valve to thereby supply more or less heat to the aircraft cabin. Since it was previously assumed that the operating arm 11 was in the mid-position, the manual member could only be moved through an arc of 37½ degrees or ¼ of the toothed area of the plate 30 to bring the operating arm 11 against the stop member 11a which represents a full open position of the valve controlling member. Had the valve member been in a closed position, it would have been necessary to have moved the operating member through an arc of 75 degrees in a counterclockwise direction, or had the valve been in a full open position at the time manual control was assumed, the manual member could not have been moved at all in a counterclockwise direction. Thus it will be seen that if the manual member is moved to the full allowable extent, the frictionally mounted sector 100 will indicate this as a full open position of the valve and thereafter the pilot or operator may retract the manual member to a position indicated on the index shield portion 106 which will represent a fractional opening of the valve.

Thus, it will be understood that the purpose of the present invention is to provide a simple and inexpensive means of indicating the position of the driven arm or the valve member at any time after manual control of the system has been assumed and that this modification is meritorious in that otherwise the pilot or operator is not aware of the position to which the manual member must be moved in order to obtain a measured response from the driven member or heat control valve.

It will be obvious in its broader aspects, that it is immaterial as to the type of power means used or the manner in which it is controlled. It will likewise be obvious that other changes may be made in my invention without departing from the spirit thereof, and I therefore intend to be limited only by the scope of the claims appended hereto.

I claim as my invention:

1. In a mechanism for positioning a driven member having a driving mechanism with a manually operable portion which when operative has a substantially greater range of movement than the range of movement of said driven member, a movable member associated with said manually operable portion which is movable by an element of said manually operable portion to indicate one extreme position of said driven member and the range of movement required of said element to move said driven member to its opposite extreme position.

2. In a planetary mechanism for controlling a driven member, having an automatically controlled planet mechanism for normally controlling said driven member and a manually operated rotatable portion for superseding said automatically controlled planet mechanism; the improvement comprising an arcuate sector frictionally mounted on said manually operated portion, said sector having projections on the opposite extremities of the arc of said sector, a manually operable member having an arcuately movable projection cooperable with one of the projections on said sector to move said sector relative to said manually controlled portion, to thereby indicate the position of said driven member during the period of manual control.

3. A dual control mechanism for positioning a control member, comprising in combination, a motor operated portion for automatically positioning said control member and a manually operable portion adapted to supersede said motor operated portion while said motor operated portion is held stationary having a manually movable member, a member for indicating the position of said control member during the period of manual control, said indicating member being frictionally mounted on said manually operable portion, and said indicating member having a projection engageable by said manually movable member whereby said manually movable member is adapted to move said indicating member to a position representing an extreme position of said control member after which said manually movable member may be independently positioned adjacent a point on said indicating member representing a position of said control member.

4. A dual control mechanism for positioning a control member, comprising in combination, a motor operated portion for automatically positioning said control member and a manually operable portion adapted to supersede said motor operated portion while said motor operated portion is held stationary having a manually movable member, a movable indicating member for indicating the position of said control member during the period of manual control, and said indicating member having opposed projections engageable by said manually movable member and being movable thereby to a position where one of said projections represents one extreme position of said control member and the opposite projection represents the other extreme position of said control member.

5. In a device of the class described, a driven member, a manually operable member for moving said driven member, a planetary gear mechanism for transmitting movement from said manually operable member to said driven member, said manually operable member being movable through an arcuate course, and a movable sector associated with said manually operable member for indicating the position of said driven member, said sector being movable relative to said manually operable member but being so disposed with relation to said manually operable member as to be movably controlled thereby.

6. In a device of the class described, a driven member, a manually operable driving member for moving said driven member, a planetary gear mechanism for transmitting movement from said manually operable member to said driven member, said manually operable member being movable through an arcuate course, a movable sector associated with said manually operable member for indicating a relative position of said driven member, said sector being movable relative to said manual member but disposed with relation to said manual member as to be movable thereby, and means for locking said manual member in a selected position with respect to said sector, representing a selected position of said driven member.

7. In apparatus of the class described, a driven member, motor operated means for positioning said member, a fixed support means, a manually adjustable member moveably attached to said support means, an indicating means moveably attached to said support means, latching means for locking said manually adjustable member to said support means, means for rendering said motor operated means immovable, mechanical means connected to said manually adjustable member for engaging and moving said indicating means to an extreme position when said manually adjustable member is adjusted to an extreme position, means operatively connecting said manually adjustable member to said driven member, and drive means for causing operation of said driven member by said motor means when said manual means is locked and for causing operation of said driven member by said manual means when said motor operated means is immoveable.

8. In apparatus of the class described, a driven member moveable through a predetermined range, a support means, a manually adjustable member moveably attached to said support means, latching means for holding said adjustable member in any one of a plurality of positions relative to said support means, mechanical means connecting said adjustable member to said driven member in such manner that full movement of said adjustable member either way from one of said positions may effect full adjustment of said driven member, and indicating means attached to said support means and having a lost motion connection with said manually adjustable member of such extent that said manually adjustable member may be moved an amount required to move said driven member through its range without causing movement of said indicating means but so that additional movement may then cause movement of said indicating means.

9. In apparatus of the class described, a driven member moveable a predetermined extent, a support means, manually adjustable means pivotally mounted on said support means and movable to any of a plurality of positions, motion transmitting means connecting said adjustable means to said driven member, said motion transmitting means being arranged so that said driven member may be operated through its predetermined extent by operation of said manually adjustable means in either direction from one of said positions, an indicating means pivotally mounted on said support means and having projections spaced apart an angular amount substantially corresponding to the angular movement of said manually adjustable means required for adjusting said driven means through said predetermined extent, and a projecting member connected to said manually adjustable means engageable with one or the other of said spaced projections.

10. In apparatus of the class described, a driven member moveable a predetermined extent, a support means, manually adjustable means pivotally mounted on said support means, said manually adjustable means having a position to which it is normally adjusted on said support means and being rotatable in opposite directions from said position, motion transmitting means connecting said adjustable means to said driven member, said motion transmitting means being arranged so that said driven member may be operated through its predetermined extent by operation of said manually adjustable means in either direction from said position, an indicating means pivotally mounted on said support means and having projections spaced apart an angular amount substantially corresponding to the angular movement of said manually adjustable means required for adjusting said driven means through said predetermined extent, spring means for urging said indicating means in frictional engagement with said support means, and a member projecting from said manually adjustable means engageable with one or the other of said spaced projections.

GEORGE H. FISHER.

REFERENCES CITED

The following references are of record in the file of this patent:

UNITED STATES PATENTS

| Number | Name | Date |
|---|---|---|
| 1,602,803 | Wilhelm | Oct. 12, 1926 |
| 1,619,419 | Herrick | Mar. 1, 1927 |
| 1,709,104 | Wilhjelm | Apr. 16, 1929 |
| 1,782,832 | Smoot | Nov. 25, 1930 |
| 1,879,154 | Fisher | Sept. 27, 1932 |
| 1,901,397 | Kuhn | Mar. 14, 1933 |
| 2,083,532 | Kronmiller | June 8, 1937 |
| 2,108,660 | Farrell | Feb. 15, 1938 |
| 2,241,475 | Olsson | May 13, 1941 |
| 2,318,727 | Webb et al. | May 11, 1943 |